Feb. 23, 1965 F. E. EYSTER 3,170,562
CONVEYOR TURN MECHANISM
Filed June 25, 1963
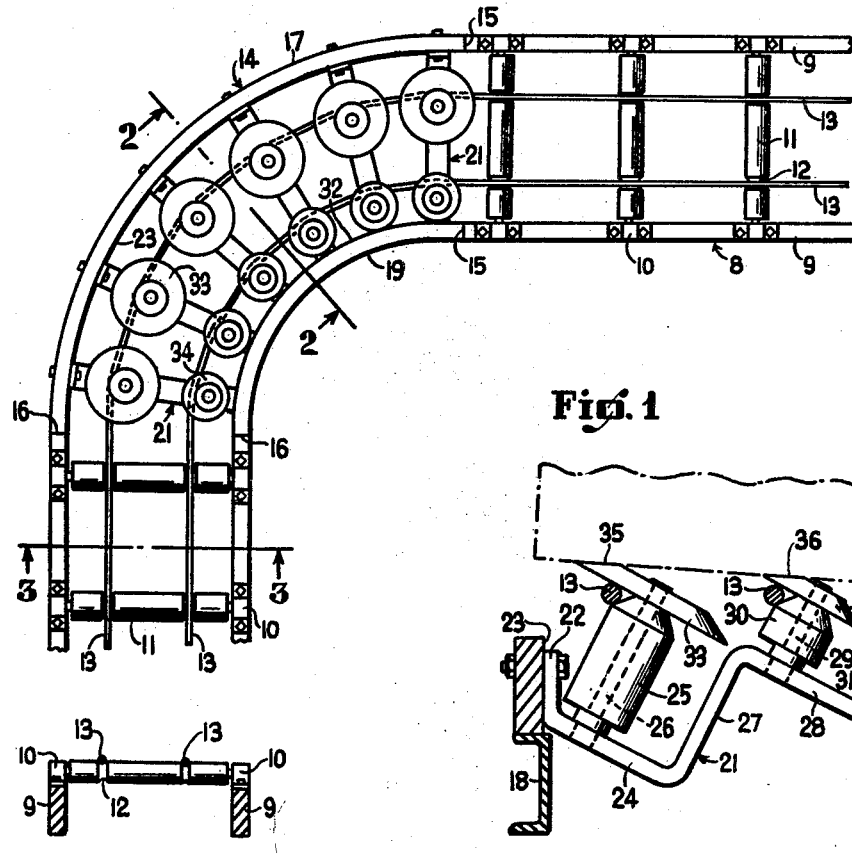
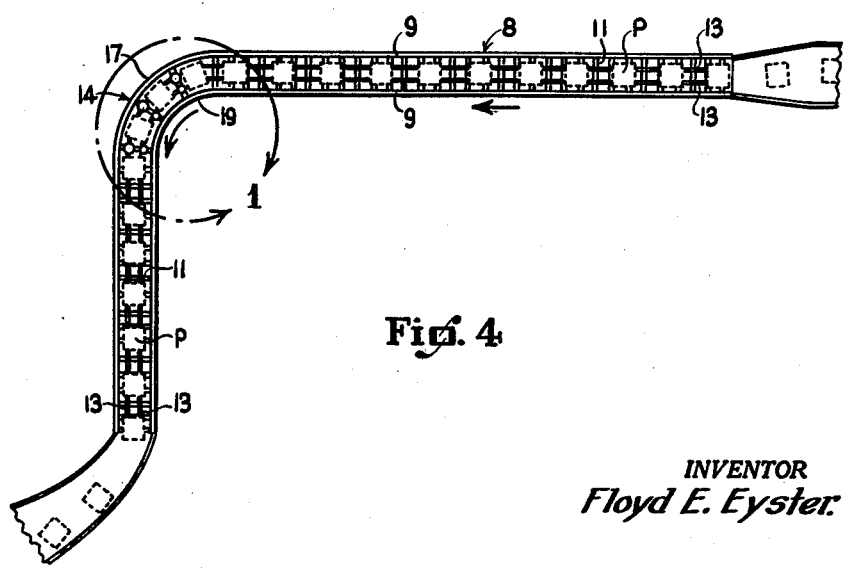
INVENTOR
*Floyd E. Eyster*

United States Patent Office

3,170,562
Patented Feb. 23, 1965

3,170,562
CONVEYOR TURN MECHANISM
Floyd E. Eyster, 7017 Forest Hills Road, Rockford, Ill.
Filed June 25, 1963, Ser. No. 290,439
3 Claims. (Cl. 198—127)

This invention relates to the art of materials handling and more particularly to mechanism adapted to permit objects placed on a roller type of conveyor to make right angle turns, a feat that is normally quite difficult to do with the usual roller type of conveyors now on the market.

As nearly any experienced person in the art of installing materials handling equipment in the form of conveyors knows, there are two basic types of roller conveyors, namely, the live roller type and the gravity type. It is the first mentioned type or live roller conveyor with which this invention is concerned. The live roller conveyor receives its name from the fact that its rollers are rotated by power driven chains, belts, or cables, thereby causing whatever is placed on top of the rollers to move along to a predetermined point on the conveyor system. While the live roller conveyors have the advantage of being able to convey packages and the like up a slight incline as well as horizontally, they, like gravity conveyors, present a problem when it is necessary that they make a right angle turn.

It is, therefore, the pre-eminent object of this invention to provide a conveyor turn mechanism for live roller conveyors having a pair of parallel cables as the moving power for whatever is placed on the conveyor.

Another object of this invention of equal importance is to provide a conveyor turn mechanism having a minimum number of parts that can be quickly installed in the turn of any live roller type of conveyor having a pair of equally spaced cables passing over the upper surface of the rollers, and at the same time providing rotating power to the structure supporting packages making a right angle turn on the conveyor.

Another object of this invention is to provide a conveyor turn mechanism that does not require the use of gears in its mechanism, thereby reducing not only its installation cost but also its maintenance cost.

Another object of this invention is to provide a conveyor turn mechanism that will support any weight or size of load at any linear speed desired.

Another object of this invention is to provide a conveyor turn mechanism that does not require any more than the normal amount of precision work for its proper installation.

Another object of this invention is to provide a conveyor turn mechanism that can readily be adapted to right angle turns of any live roller conveyor already in use.

Still one more object of this invention is to provide a conveyor turn mechanism that can be manufactured from existing mechanical parts without resorting to the fabrication of special structures and the like.

In accomplishing these and other objects of the invention, I have provided the improved details of construction, the preferred forms of which are illustrated in the accompanying drawings, wherein:

FIGURE 1 is an enlarged top view of a portion of a typical live roller conveyor having a pair of cables with this invention installed in a right angle turn, which is encircled and indicated by the arrowed circle and numeral 1 in FIGURE 4.

FIGURE 2 is an enlarged sectional view of FIGURE 1 taken along line 2—2 of that figure.

FIGURE 3 is a sectional view of FIGURE 1 taken along line 3—3 of that figure.

FIGURE 4 is a top view of a typical live roller conveyor with this invention installed in a right angle turn with square packages shown moving along on the cable powered rollers.

Referring more in detail to the drawing, there is indicated by the reference numeral 8 a typical live roller conveyor embodying the usual side frames 9, on each one of which is located a plurality of equally spaced pillow blocks 10. Each pillow block 10 rotatably supports one end of the roller 11 of which there is any desired number, depending of course on the overall length of the conveyor. Each one of the rollers 11 is provided with a pair of spaced peripheral U-shaped recesses 12, in which rides the object supporting power cable 13 on the upper surface of each roller, as best shown in FIGURE 3 of the appended drawing. Each one of the two cables 13 not only provides turning power for the rollers but also a longitudinally moving support for any object that is placed on the conveyor for transportation from one place to another.

Directing one's attention now to FIGURES 1 and 2 of the appended drawing, it will be seen that at any right angle turn the live roller conveyor of this instant invention is provided with a right angle turn section 14 having its ends terminate at points indicated in FIGURE 1 by the numerals 15 and 16. Each right angle section 14, which of course is this invention, embodies an outer side frame 17 resting on channel 18 and an inner side frame 19 resting on channel 20. A plurality of roller supporting bars 21 are located in equal and radial spaced relation between the aforesaid outer side frame 17 and the inner side frame 19. Each one of the aforesaid roller supporting bars 21 consists of a vertically disposed end 22 that is bolted or otherwise secured to the inner side surface 23 of the outer side frame 17 and an inclined portion 24, which is at right angle to the free turning roller 25 rotatably mounted on the shaft 26, while the inner end of the aforesaid inclined portion 24 of the roller supporting bar terminates in a vertical and inclined step 27 that is parallel to the aforesaid free turning roller 25, as clearly shown in FIGURE 2 of the appended drawing, where it is also seen that the upper end of the inclined step 27 is bent or otherwise formed into a right angle inclined portion 28 that supports the stub shaft 29, on which is rotatably mounted the free turning roller 30. The inner end of the aforesaid inclined portion 28 of the roller supporting bar 21 terminates in a vertically disposed end 31 that is bolted or otherwise secured to the outer surface 32 of the aforesaid inner side frame 19.

Continuing to look at FIGURE 2 of the appended drawing, one sees that the upper end of roller 25 is tapered toward its center and supports the beveled edge object supporting disk 33, which is suitably secured to the upper end of the aforesaid shaft 26, while the upper end of roller 30 is likewise tapered toward its center and supports the beveled edge object supporting disk 34, which is secured to the aforesaid stub shaft 29. One of the already mentioned power cables 13 passes between and is in contact with the underside of the object supporting disk 33 and the beveled periphery of roller 25, while the other power cable, that is also characterized by the reference numeral 13, likewise passes between and is in contact with the underside of the object supporting disk 34 and the beveled periphery of the aforesaid roller 30, thereby providing the necessary turning power to the two object supporting disks 33 and 34 respectively.

Object supporting disks 33 and 34 are mounted at an angle in a way that will permit the beveled periphery 35 of the first mentioned disk 33 and the beveled periphery 36 of the second mentioned disk 34 to be in perfect alignment for the actual support of the object by this portion of both of the aforesaid disks.

Looking again at the appended drawing, it will be seen that the first mentioned object supporting disk 33 is twice the diameter of the second mentioned object supporting disk 34. The reason for this is to permit the object making the right angle turn on this novel invention to ride squarely across the conveyor, whose power cables 13, of course, necessarily travel at the same speed. Each package is carried forward at twice the speed on the outside of the curve while making the turn, thus remaining in proper position on the conveyor after completing the turn. The package(s) indicated in FIGURES 2 and 4 of the drawing are characterized by the reference letter P and are shown in phantom lines.

Other modes of applying the principle of my invention may be employed instead of the one explained, change being made as regards the mechanism herein disclosed, provided the means stated by any of the following claims or the equivalent of such stated means be employed.

Having thus described my invention, what I claim as new therein and desire to secure by Letters Patent is:

1. A turn conveyor mechanism of the character described, comprising a right angle turn section embodying a pair of equally spaced and parallel side frames mounted on top of channels and having their ends secured to the ends of corresponding straight side frames, a plurality of equally spaced rollers extending across the straight side frames, each roller having a pair of spaced peripheral grooves, a pair of equally spaced and parallel cables running in said peripheral recesses of each roller of the said conveyor and on top of each roller of the said conveyor, and a plurality of roller support bars in radial and equal spaced relation to each other, each roller support bar having its ends secured to the inner sides of the said side frames of the said right angle turn section, and each said roller support bar supporting a pair of spaced inclined axles, a free turning roller on each axle, each one of said rollers having a tapered peripheral recess, an object supporting disk secured to the upper end of each roller, each disk having a beveled periphery, the said rollers and disk being inclined at such an angle as to permit the object, which it movably supports, to rest on the said beveled periphery, and the said cables and said cables rotating said rollers and said disks by riding in said tapered peripheral recesses of said rollers.

2. A turn conveyor mechanism of the character described, comprising a right angle turn section embodying a pair of equally spaced and parallel side frames mounted on top of channels and having their ends secured to the ends of corresponding straight side frames, a plurality of equally spaced rollers extending across the straight side frames, each roller having a pair of spaced peripheral grooves, a pair of equally spaced and parallel cables running in said peripheral recesses of each roller of the said conveyor and on top of each roller of the said conveyor, and a plurality of roller support bars in radial and equal spaced relation to each other, each roller support bar having its ends secured to the inner sides of the said side frames of the said right angle turn section, and each said roller support bar supporting a pair of spaced inclined axles, a free turning roller on each axle, each one of said rollers having an inwardly tapered upper end on which is secured an object supporting disk having a beveled periphery, the said rollers and disk being inclined at such an angle as to permit the object, which it movably supports, to rest on the said beveled periphery, and each cable rotating the said rollers and said disk by riding on the tapered upper end of the said rollers and against the underside of the said disk, thereby moving any objects placed on the conveyor around the turn.

3. A turn conveyor mechanism of the character described, comprising a right angle turn section embodying a pair of equally spaced and parallel side frames mounted on top of channels and having their ends secured to the ends of corresponding straight side frames, a plurality of equally spaced rollers extending across the straight side frames, each roller having a pair of spaced peripheral grooves, a pair of equally spaced and parallel cables running in said peripheral recesses of each roller of the said conveyor and on top of each roller of the said conveyor, and a plurality of roller support bars in radial and equal spaced relation to each other, each roller support bar having its ends secured to the inner sides of the said side frames of the said right angle turn section, and each said roller support bar supporting a pair of spaced inclined axles, a free turning roller on each axle, each one of said rollers having an inwardly tapered upper end on which is secured an object supporting disk, the disk being nearest the outside radius of the said turn conveyor mechanism being twice the diameter of the disk being nearest the inside radius of the same turn conveyor mechanism and all disks having a beveled periphery, the said rollers and disk being inclined at such an angle as to permit the object, which it movably supports, to rest on the said beveled periphery, and each cable rotating the said rollers and said disk by riding on the tapered upper end of the said rollers and against the underside of the said disk, thereby moving any objects placed on the conveyor around the turn.

References Cited by the Examiner

UNITED STATES PATENTS

| | | | |
|---|---|---|---|
| 701,024 | 5/02 | Edwards | 198—107 |
| 2,129,510 | 9/38 | Taylor | 198—127 |
| 2,729,324 | 1/56 | Howdle | 198—127 |

SAMUEL F. COLEMAN, *Primary Examiner.*

WILLIAM B. LA BORDE, *Examiner.*